Mar. 6, 1923.
N. PAZOS.
SHEARS.
FILED APR. 9, 1921.
1,447,483.
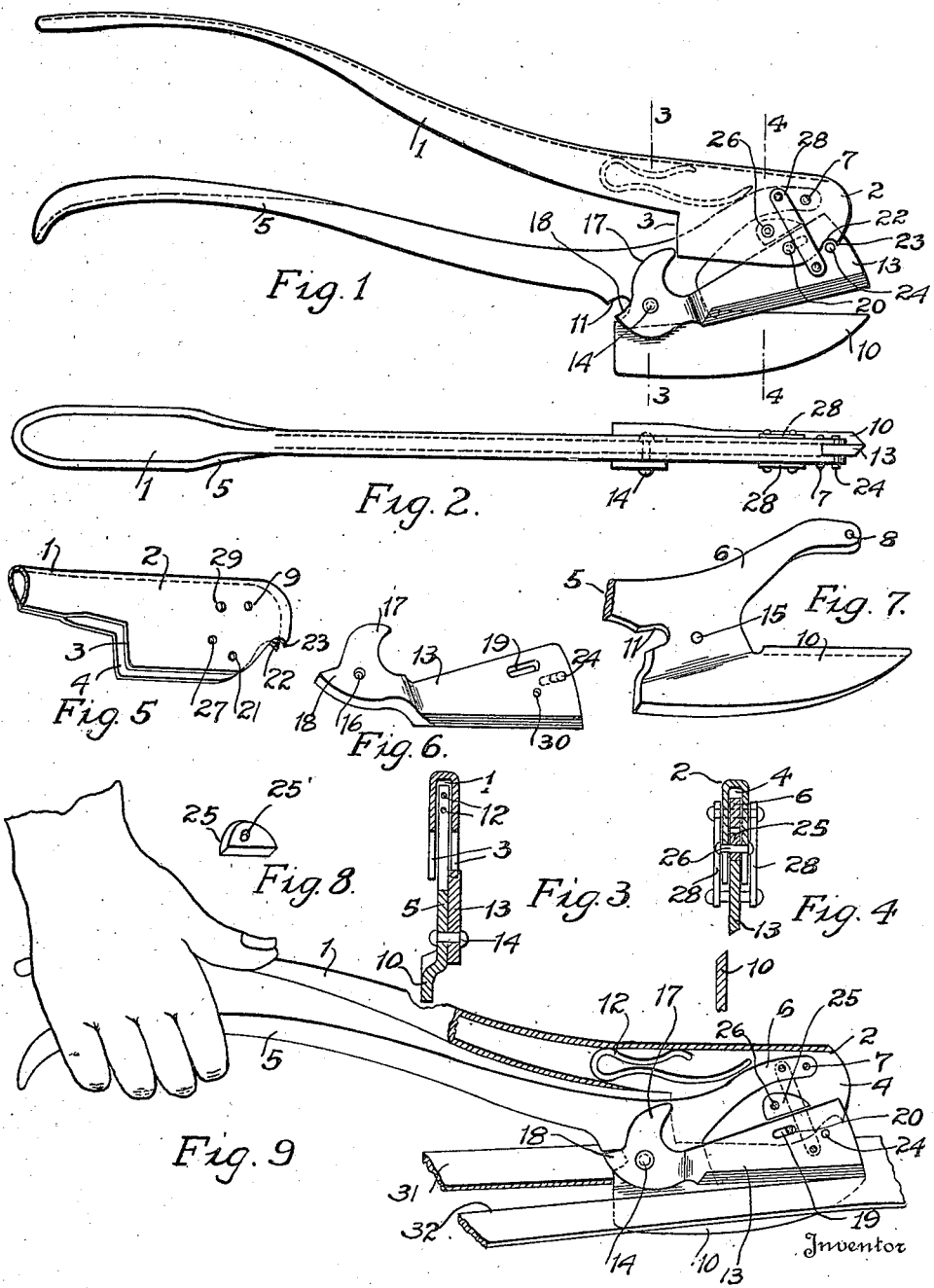

Patented Mar. 6, 1923.

1,447,483

UNITED STATES PATENT OFFICE.

NICOLÁS PAZOS, OF HABANA, CUBA.

SHEARS.

Application filed April 9, 1921. Serial No. 459,939.

*To all whom it may concern:*

Be it known that I, NICOLÁS PAZOS, a subject of the King of Spain, and resident of Habana, Cuba (whose postal address is #3 Matadero Street, Habana, Cuba), have invented certain new and useful Improvements in Shears, of which the following is a specification.

This invention relates to shears which can be used for cutting metal sheets and provided with means for the purpose of cutting wires and its main object is to provide a shear construction which renders them capable of cutting sheets of any thickness and length by hand pressure and whose handles can be operated above the sheet cut by the shears without the continued pressure exerted to cut the sheet which may tire the muscles of the hand operating the handles.

Another object of the invention is to provide shears capable of cutting sheets of any thickness without the sections of sheet cut being rolled up during the cutting operation as it happens when cutting sheet metal with the shears at present in use, thus obtaining a perfect clean cutting.

A further object of the invention is to provide a tool capable of being easily and efficiently handled by the operator.

Still a further object of the invention is to provide a shear having an oscillating shear blade which is caused to be actuated forward by means of compressing and guiding members and cam actuating members and caused to fall back to inoperative position through the same means.

Other advantages and different considerations will become evident to those expert in the art during the course of this specification, reference being had to the annexed drawings, in which:

Fig. 1 is a side elevation view of the shears forming the subject-matter of this invention.

Fig. 2 is an upper plan view thereof.

Fig. 3 is a vertical cross section on line 3—3 of Fig. 1.

Fig. 4 is a cross-vertical section on line 4—4 of Fig. 1.

Fig. 5 is a perspective view in partial detail of the upper handle of the shears.

Fig. 6 is a perspective view in detail of the oscillating shear blade.

Fig. 7 is a perspective view in partial detail of the lower handle member and integral shear blade.

Fig. 8 is a perspective view in detail of the guide block and sliding for the oscillating blade.

Fig. 9 is a perspective partially cut off view of the shears showing it in the operation of cutting a metal sheet.

The shears forming the subject matter of this invention comprises an upper handle member 1 which is curved downward to the front and terminates in a widened front end or head 2 provided at its lower rear part with curved projections 3, and on its lower front part of curved recesses 22 terminating in stops 23. Handle 1 is longitudinally hollowed as shown in Fig. 9 forming at its head 2 a recess 4. The lower handle member 5 of the shears is also curved downwards to the front and terminates on a forked end whose upper fork 6 is raised and lodges in recess 4 being connected therein by means of a pivotal pin 7 passing through holes 8 and 9 in the upper fork 6 and walls of recess 4 respectively. The lower fork of the fork constitutes a horizontal shear blade 10 which is not in the same vertical plane as fork 6 but projects out angularly to the same as illustrated in Figs. 3 and 7 of the drawings and on the rear part thereof there is a low cut 11 with the object that will be hereinafter explained. Between the upper fork 6 and the front end of handle 1 is arranged a two branch spring 12 which is lodged in the recess of said handle and rests its upper branch on the upper wall of recess 4 and its longer lower branch bears against the upper edge of branch 6 of the handle member 5.

Cooperating with the shear blade 10 there is a rocking shear blade 13 whose lower edge is sharp and which has its rear part angularly bent out with respect to its forward portion which is of trapezoidal shape, said rear part bearing on the union portion of the two branches 6 and 10 and being connected therein by means of a pivotal pin 14 passing through holes 15 and 16 existing respectively in that portion of the handle member 5 and blade 13. At the rear part of blade 13 there is a finger or raised shoulder 17 designed to slide on the surface of the curved recesses 3 of head 2 which substantially constitute cams and an approximate horizontal shoulder 18 which constitutes with the edges of the low cut 11 a shear for cutting wires.

Blade 13 has at its front part near its upper edge and parallel thereto a slot 19 in which slot can run in a reciprocating manner a pin 20 fixed through holes 21 on the lower part of recess 4 and below said slot in advanced position thereto there is a horizontal pin 24 fixed to blade 13 which is adapted to slide in recesses 22 of head 2. In recess 4 there is a guiding block 25 detailed in Fig. 8 whose lower face is plane said block being arranged below the branch 6 and in frictional contact with the upper edge of blade 13 being secured in position therein by means of a pivotal pin 26 passing through holes 27 and 25' on the sides of recess 4 and on the same block respectively. Blade 13 is finally articulated with respect to each side of head 2, exteriorly thereto, by means of two links 28 articulated at its ends by pivotal pins passing through holes 29 and 30 on head 2 and blade 13 respectively.

In Fig. 9 of the drawings is illustrated the manner of operating these shears and it can be observed how the described arrangement of the handle members 1 and 5 permit to be invariably above the sheet to be cut, which is a great advantage and ease for the operator as it will be readily understood by those expert in the art and it also aids to the cleaner cutting of the sheet preventing the rolling up of the sections cut. Thus, therefore, in said figure is represented the shears cutting a metal sheet 31 the shear blades 10 and 13 effecting the cutting perfectly right as indicated in 32 the handles 1 and 5 being arranged above the sheet 31.

Finger 17 on sliding up on the surface of recesses 3, the fixed horizontal pivot 24 when sliding on the surface of the curved recesses 22 and block 25 frictionally bearing on the upper edge of the rocking blade 13 as well as the links 28 will cause the multiplication of the pressure exerted on the handle members 1 and 5 the said advancing movement being guided by pivot 20 reciprocally sliding along the horizontal slot 19 and the metal sheet being thus cut, even if its thickness be greater than that of the sheets cut with the shears at present in use.

The spring of branches 12 will cause all parts to fall back to their initial position and will keep the shear blades 10 and 13 in open position when pressure on the handle members 1 and 5 is released.

The shear formed by the upper edge of the low cut 11 with shoulder 18 will be capable of cutting wires through pressure being exerted on the handle members with the same action of the members before mentioned.

It is evident that different changes can be made in the construction of the described shears as well as to do away with certain of the constituting parts according to the efficiency that might be desired for cutting sheets and sectioning wires of different thickness, whereby I do not desire to be limited to the specific construction set forth, but desire the Letters-Patent to cover all that which may fall within the scope of the appended claims.

What I claim is:—

1. A shear comprising an upper handle member leading downwardly forward and terminating in a head or widened front end, hollow in its under side, a lower handle member leading downwardly forward terminating in a forked fore end whose upper branch is pivoted in the hollow head of the upper handle member and having a lower branch which forms a horizontal shear blade in different vertical plane with the upper branch; a rocking shear blade pivoted at the junction point of the two fork branches of the lower handle cooperating with the horizontal shear blade; a connection sliding reciprocally between the head of the upper handle member and the rocking blade and a spring interposed between the two upper and lower handle members.

2. A shear comprising an upper handle member longitudinally hollowed leading downwardly forward terminating in a head or widened fore end having curved projections on its lower rear part; a lower handle member forwardly inclined and terminating in a fork end whose upper branch is raised and is pivoted in the recess of the head of the upper handle and having a lower branch which constitutes a shear blade arranged in different vertical planes to the upper branch; a shear blade pivoted at the junction point of both branches of the fork in which terminates the lower handle and whose rear part is angularly bent outwards; a shoulder on the rear part of the rocking blade which actuates reciprocally on the curved surface of the recesses in the lower rear part of the head of the upper handle; a reciprocating sliding connection between the rocking blade and the head of the upper handle and a spring interposed between the upper handle and the lower handle of the shear.

3. A shear comprising an upper handle member longitudinally hollowed leading downwardly forward and terminating in a head or widened fore end provided with curve projections at its rear lower part and curved recesses terminated in stop shoulders at its lower fore part; a lower handle member leading downwardly forward terminating in a forked end whose upper branch is raised being pivoted at its end in the hollow portion of the head of the upper handle member and its lower branch forms a horizontal shear blade which is not in the same vertical plane as the upper branch; a rocking shear blade pivoted at the junction point of the two branches of the fork and whose rear part is bent angularly with respect to its front part and has a raised shoulder of finger actuating slidably on the surfaces of the recesses at the lower rear part of the head of the upper shear member; a reciprocally sliding connection between the rocking shear blade and the head of the upper handle member; a horizontal pin fixed at the front part of the rocking shear blade and slidable on the curved recesses in the lower front part of the head of the upper handle member; and a spring interposed between the upper and lower handle members.

4. A shear comprising a longitudinally hollowed upper handle member extending downwardly forward and terminating in a front enlarged head or end provided with curved projections at its rear part and of curved recesses terminating in stop shoulders at its lower front part; a lower handle member extending downwardly forward terminating in a fork end whose upper branch is raised being pivoted at its end in the hollow of the head of the upper handle member and its lower branch constitutes a horizontal shear blade which is not in the same vertical plane as the upper branch; a rocking shear blade pivoted on the junction point of the two branches of the fork and whose rear part is bent angularly with respect to its front part and has a raised shoulder or finger slidably actuating on the surface of the curved recesses at the rear lower part of the upper handle member; a horizontal pin fixed on the front part of the rocking blade adapted to slide on the surface of the curved recesses in the lower front part of the head of the upper handle member; a block whose lower face is plane and is in continued frictional contact with the upper edge of the rocking blade lodged in the recess on the head of the upper handle member and pivoted therein; a reciprocating sliding connection between the rocking shear blade and the head of the upper handle member and a spring interposed between the upper and lower handle members.

5. A shear comprising a longitudinally hollowed upper handle member extending downwardly forward and terminating in a front enlarged head or end provided with curved projections at its lower rear part and of curved recesses on its lower front part which terminate in stop shoulders; a lower handle member extending downwardly forward terminated in a forked end whose upper branch is raised being pivoted on its front end in the hollow of the head of the upper handle member and its lower branch constitutes a horizontal shear blade which is not in the same vertical plane as the upper branch; a rocking shear blade pivoted at the junction point of the two branches of the fork and whose rear part is bent angularly with respect to its front part having rearwardly a raised finger or shoulder adapted to slide on the surface of the curved recesses at the rear lower part of the upper handle member; a horizontal pin fixed at the front part of the rocking shear blade adapted to slide on the surface of the curved recesses at the front lower part of the upper handle member; a block whose lower face is plane and is in continued frictional contact with the upper edge of the rocking shear blade lodged in the recess of the head of the upper handle member and pivoted therein; a connection of slot and pivot reciprocally sliding therein between the rocking shear blade and the head of the upper handle member, link members respectively articulated to the head of the upper handle member and to the rocking shear blade and a spring interposed between the upper and lower handle members.

In witness whereof I affix my signature.

NICOLÁS PAZOS.